United States Patent

Shiroyama et al.

[11] Patent Number: 6,018,199
[45] Date of Patent: Jan. 25, 2000

[54] STARTER FOR ENGINE EQUIPPED WITH MOTOR GENERATOR

[75] Inventors: Shigeru Shiroyama; Motoi Hisamoto, both of Tokyo, Japan

[73] Assignee: Mitsubishi Denki Kabushiki Kaisha, Tokyo, Japan

[21] Appl. No.: 09/157,313

[22] Filed: Sep. 21, 1998

[30] Foreign Application Priority Data

Mar. 20, 1998 [JP] Japan .................................. 10-072295

[51] Int. Cl.$^7$ .................................................. F02N 11/00
[52] U.S. Cl. ...................................... 290/37 A; 123/179.3
[58] Field of Search ................................ 290/30 R, 31, 290/32, 34, 36 R, 37 A, 46; 123/179.1, 179.2, 179.3, 179.4

[56] References Cited

U.S. PATENT DOCUMENTS

| | | | |
|---|---|---|---|
| 4,495,905 | 1/1985 | Morishita et al. | 123/179 F |
| 4,862,009 | 8/1989 | King | 290/22 |
| 4,959,595 | 9/1990 | Nishimura | 318/138 |
| 5,075,616 | 12/1991 | Mitsui | 322/10 |
| 5,111,057 | 5/1992 | Sugiyama | 290/38 R |
| 5,563,454 | 10/1996 | Araki et al. | 307/10.6 |
| 5,642,696 | 7/1997 | Matsui | 123/179.1 |
| 5,818,115 | 10/1998 | Nagao | 290/31 |

FOREIGN PATENT DOCUMENTS

| | | |
|---|---|---|
| 62-150074 | 7/1987 | Japan . |
| 1-138369 | 5/1989 | Japan . |
| 10-68374 | 3/1998 | Japan . |

*Primary Examiner*—N. Ponomarenko
*Attorney, Agent, or Firm*—Sughrue, Mion, Zinn, Macpeak & Seas, PLLC

[57] ABSTRACT

A starter for an engine equipped with a motor generator achieves lower cost and reduced sizes and capacities of circuit elements by reducing the assist load on the motor generator: it is provided with a motor generator (2) and a starting motor (10) connected to an engine (1); a startup state determining circuit (20) which determines the startup state from operating condition and selectively issues ON signals M1 and M2 to the motor generator and the starting motor; a key switch (6) which generates a start signal (Qe) at the time of starting the engine; and a temperature sensor 12 which generates a temperature signal (Te) corresponding to the temperature of the engine. The startup state determining circuit actuates only the motor generator as a motor in a startup state wherein the temperature signal indicates not less than a predetermined temperature corresponding to the warm-up state of the engine, while it actuates both the starting motor and the motor generator in a startup state wherein the temperature signal indicates a temperature below the predetermined temperature. And the startup state determining circuit actuates the starting motor first, then actuates the motor generator after a delay time corresponding to a rush current period of the starting motor has elapsed in the second startup state.

5 Claims, 3 Drawing Sheets

STARTER FOR ENGINE EQUIPPED WITH MOTOR GENERATOR

BACKGROUND OF THE INVENTION

1. Field of the Invention

The present invention relates to a starter for an engine equipped with a motor generator employed for a hybrid vehicle provided with a power generating function and, more particularly, to a starter for an engine equipped with a motor generator that has achieved lower cost by reducing the load on the motor generator at the time of startup at low temperature, for which the engine requires a higher assist torque, so as to reduce the sizes and capacities of circuit elements.

2. Description of the Related Art

Hybrid vehicles equipped with motor generators have conventionally been well known. In this type of vehicles, the motor generator interlocked with the engine is used to convert engine output to generated electric power and to assist the engine output as necessary.

Normally, when the vehicle is traveling, the battery is charged by the rotary output of the engine; at the time of torque assist when the engine is started up, a startup torque is supplied to the engine by the battery output. This makes it possible to obviate the need of a startup motor that responds to a key switch.

FIG. 3 is a block diagram schematically showing the starter for an engine equipped with a motor generator employed for a conventional hybrid vehicle.

In FIG. 3, a motor generator 2 employing an induction generator is directly connected to an engine 1.

Connected to the motor generator 2 is an inverter 3 serving as the power supply of the motor generator 2.

Connected to the inverter 3 is a battery 4 and a motor generator control circuit 5.

The inverter 3 has an AC terminal, a DC terminal, and a control terminal. The motor generator 2 is connected to the AC terminal; a battery 4 is connected to the DC terminal; and a motor generator control circuit 5 is connected to the control terminal.

The motor generator control circuit 5, for example, receives start signal Qe from a key switch 6, and the operational information from various other types of sensors. The motor generator control circuit 5 controls the inverter 3 in accordance with the operating condition of the engine 1.

More specifically, to make the motor generator 2 function as a driving motor for startup or the like, for example, the motor generator control circuit 5 converts the electric power of the battery 4 from direct current to alternating current by the inverter 3 to control the drive of the motor generator 2.

To make the motor generator 2 function as a generator, the motor generator control circuit 5 converts the generated power of the motor generator 2 by the revolution of the engine 1 from direct current to alternating current by the inverter 3 to charge the battery 4.

Thus, the motor generator 2 works as a driving motor at the time of assisting torque for starting the engine 1, while it works as a generator at the time of power regeneration during travel or at the time of braking.

As described above, the starter for the engine equipped with the motor generator is capable of providing the torque assisting function for the engine 1 and the power generating function by employing the motor generator 2.

Furthermore, when the engine 1 is in a warm-up state, the required torque for startup is small; hence, the motor generator 2 can be made smaller and the capacities of the power element in the inverter 3 and the battery 4 can be reduced.

When, however, starting up the engine 1 at a low temperature, i.e. when the engine 1 has not yet been fully warmed up, the engine 1 requires a larger torque; therefore, in order to make up for the torque of the engine 1 supplied using only the motor generator 2, it is necessary to make the motor generator 2 larger and also to increase the capacities of the power element in the expensive inverter 3 and the battery 4.

Thus, the conventional starter for the engine equipped with the motor generator employs only the motor generator 2 to assist the output torque of the engine 1; hence it has been presenting a problem in that achieving a satisfactory assisting function requires the motor generator 2 be made larger and the capacities of the inverter 3 and battery 4 be increased, leading to higher cost.

SUMMARY OF THE INVENTION

Accordingly, the present invention has been made with a view toward solving the problem described above, and it is an object thereof to provide a starter for an engine equipped with a motor generator that has achieved lower cost by reducing the assist load on the motor generator for the engine so as to reduce the sizes and capacities of circuit elements.

According to the present invention, there is provided a starter for an engine equipped with a motor generator, comprising: a motor generator directly connected to an engine; a battery connected to the motor generator via an inverter; a motor generator control circuit for controlling the motor generator via the inverter; a starting motor composed of a DC motor connected to the engine at the time of startup; an ON/OFF switch for selectively switching the feeding from the battery to the starting motor; various sensors for detecting the operating condition of the engine; and a startup state determining circuit which determines the startup state of the engine according to the operating condition of the engine and selectively issues ON signals to the ON/OFF switch and the motor generator control circuit; wherein various sensors include a key switch for generating a startup signal at the time of engine startup and a temperature sensor for generating a temperature signal corresponding to the temperature of the engine; the startup state determining circuit issues the ON signal only to the motor generator control circuit to actuate the motor generator as a motor in a first startup state wherein the temperature signal indicates not less than a predetermined temperature which corresponds to the warm-up state of the engine, while it issues the ON signal to both the ON/OFF switch and the motor generator control circuit to actuate both the starting motor and the motor generator in a second startup state wherein the temperature signal indicates a level below the predetermined level; and the startup state determining circuit actuates the starting motor first, then actuates the motor generator after a delay time corresponding to a rush current period of the starting motor has elapsed in the second startup state.

In another preferred form, the delay time in the starter of the engine equipped with the motor generator in accordance with the present invention is set to a range of 0.01 sec. to 0.5 sec.

In a further preferred form according to the present invention, there is provided a starter for an engine equipped with a motor generator, comprising: a motor generator directly connected to an engine; a battery connected to the motor generator via an inverter; a motor generator control circuit for controlling the motor generator via the inverter; a starting motor connected to the engine at the time of startup; an ON/OFF switch for selectively switching the feeding from the battery to the starting motor; various sensors for detecting the operating condition of the engine which include a revolution sensor generating a revolution signal corresponding to the number of revolutions of the engine; and a startup state determining circuit which determines the startup state of the engine according to the operating condition of the engine and selectively issues ON signals to the ON/OFF switch and the motor generator control circuit; wherein various sensors include a key switch for generating a startup signal at the time of engine startup and a temperature sensor for generating a temperature signal corresponding to the temperature of the engine; the startup state determining circuit issues the ON signal only to the motor generator control circuit to actuate the motor generator as a motor in a first startup state wherein the temperature signal indicates not less than a predetermined temperature which corresponds to the warm-up state of the engine, while it issues the ON signal to both the ON/OFF switch and the motor generator control circuit to actuate both the starting motor and the motor generator in a second startup state wherein the temperature signal indicates a level below the predetermined level; and the startup state determining circuit stops the ON signal to the ON/OFF switch if the revolution signal indicates not less than a first predetermined number of revolutions corresponding to the cranking speed of the engine after the starting motor and the motor generator are actuated in the second startup state.

In a further preferred form, the startup state determining circuit in the starter of the engine equipped with the motor generator in accordance with the present invention stops the ON signal to the motor generator control circuit if the revolution signal indicates not less than a second predetermined number of revolutions corresponding to the idling speed of the engine after the ON signal to the ON/OFF switch is stopped in the second startup state.

In yet another preferred form, the diverse sensors in the starter of the engine equipped with the motor generator in accordance with the present invention include a revolution sensor generating a revolution signal corresponding to the number of revolutions of the engine; and the startup state determining circuit stops the ON signals to the ON/OFF switch and the motor generator control circuit if the revolution signal indicates not less than a predetermined number of revolutions corresponding to the idling speed of the engine after the starting motor and the motor generator are actuated in the second startup state.

DESCRIPTION OF THE PREFERRED EMBODIMENTS

First Embodiment

A first embodiment of the present invention will be described in conjunction with the accompanying drawings.

Figure 1:
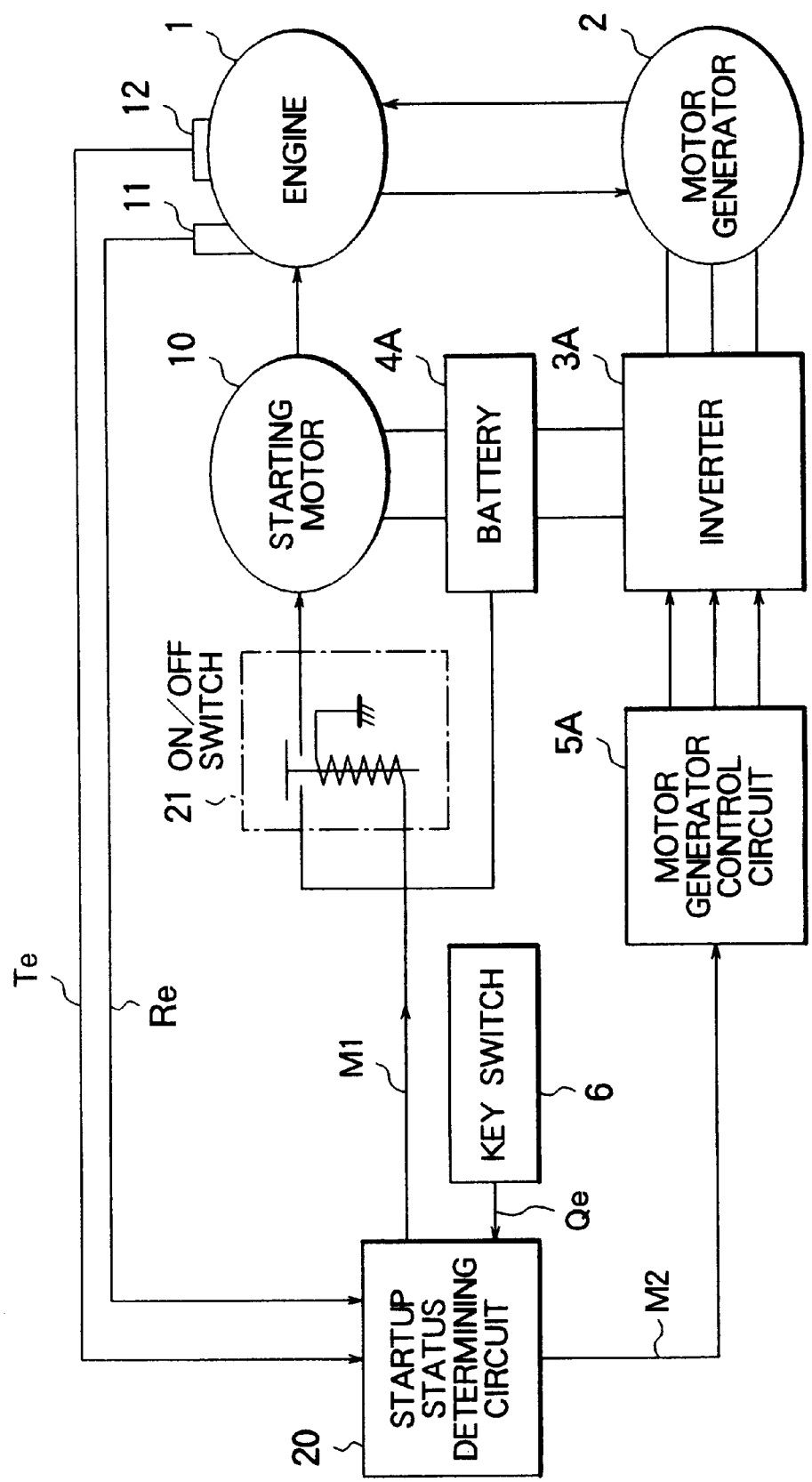
FIG. 1 is a block diagram schematically showing an embodiment of the present invention.

FIG. 1 is a block diagram showing the schematic constitution of the first embodiment of the invention; like elements as those shown in FIG. 3 will be given like reference numerals, and the detailed description will be omitted.

Figure 3:
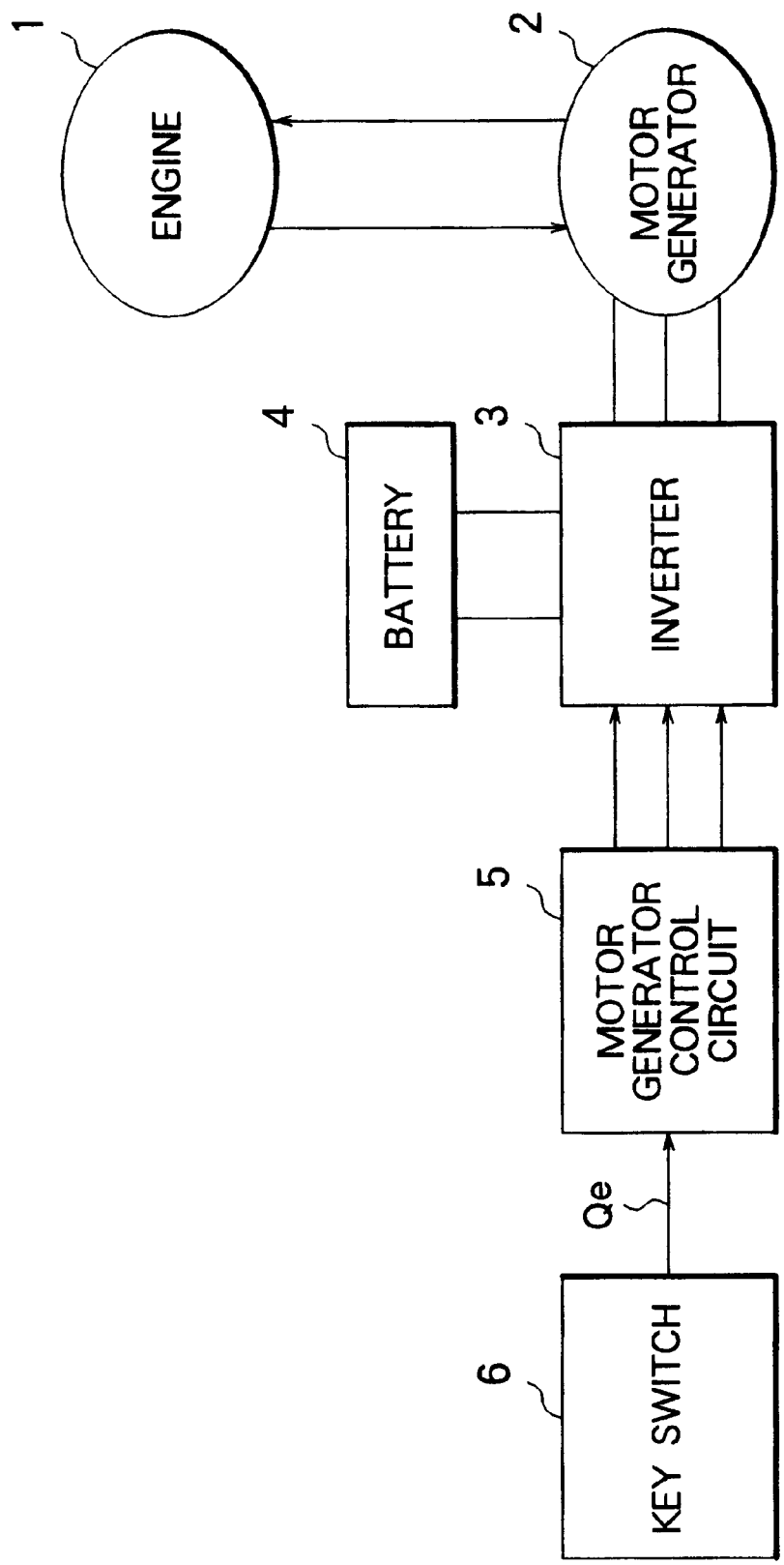
FIG. 3 is a block diagram schematically showing a conventional starter for an engine equipped with a motor generator.

The elements corresponding to those shown in FIG. 3 will be denoted by reference numerals followed by A, and the detailed description will be omitted.

A motor generator 2 may alternatively be composed of a DC brushless generator.

In this case, a starting motor 10 as well as a motor generator 2 are connected to an engine 1. Attached also to the engine 1 are a revolution sensor 11 and a temperature sensor 12 as the sensors for detecting the operating state of the engine.

The starting motor 10 composed of a DC motor is connected to the engine 1 only at the time of startup to generate a sufficiently large output torque via a transmission mechanism having a large reduction ratio.

The revolution sensor 11 and the temperature sensor 12 generate a revolution signal Re (engine speed) and a temperature signal Te (engine temperature) as the operational information on the engine 1 and supply the respective signals to a startup state determining circuit 20.

As it will be discussed later, the startup state determining circuit 20 responds to a startup signal Qe and selectively issues ON signals M1 and M2 to the starting motor 10 and the motor generator 2 according to the operating condition of the engine 1.

The revolution sensor 11 is constituted by, for example, a crank angle sensor provided on the crankshaft of the engine 1; it may generate a crank angle signal as the revolution signal Re.

The temperature sensor 12 is constituted by, for example, a water temperature sensor or oil temperature sensor for detecting the cooling water temperature of the oil temperature of the engine 1; it may generate a water temperature signal or oil temperature signal as the water temperature signal Te.

A battery 4A is connected to the starting motor 10 via an ON/OFF switch 21 composed of a semiconductor switch or an electromagnetic relay switch or the like.

The ON/OFF switch 21 closes or turns ON in response to the ON signal M1 received from the startup state determining circuit 20 and feeds the power of the battery 4A to the starting motor 10.

Figure 2:
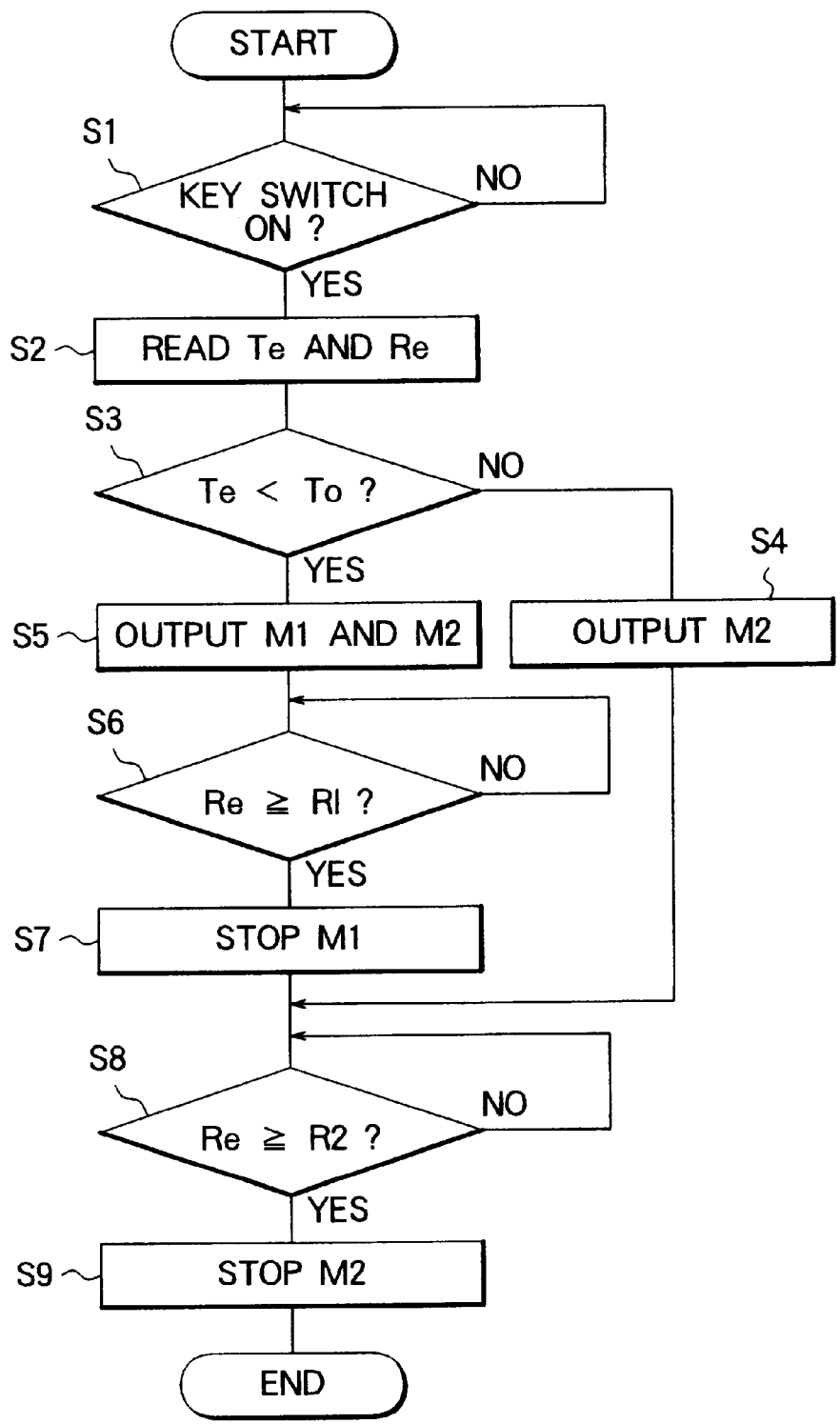
FIG. 2 is a flowchart illustrating the operation of the embodiment of the present invention.

The operation of the first embodiment shown in FIG. 1 will now be described with reference to the flowchart of FIG. 2. FIG. 2 illustrates the processing operation of startup state determining circuit 20.

First, when a key switch 6 is turned ON, the start signal Qe is supplied to the startup state determining circuit 20.

The startup state determining circuit 20 determines in step S1 whether the key switch 6 has been turned ON and determines upon receipt of the start signal Qe that the key switch 6 has been turned ON (the determination result is YES); then, it captures the operating condition, namely, the revolution signal Re and the temperature signal Te, of the engine 1 from the sensors, namely, the revolutions sensor 11 and the temperature sensor 12, in step S2.

Subsequently, the startup state determining circuit 20 determines the startup state of the engine 1, namely, whether it is in a warm-up startup state or a low-temperature startup state, by referring to the temperature signal Te received from the temperature sensor 12, and decides whether the starting motor 10 and the motor generator 2 should be actuated, that is, whether it should issue the ON signals M1 and M2.

To be more specific, the startup state determining circuit 20 compares the temperature signal Te with a predetermined temperature To corresponding to the warm-up state of the engine 1 and determines in step S3 whether the temperature signal Te (engine temperature) is smaller than the predetermined temperature To.

If Te≧To, that is, if the determination result is NO, then it means that the engine 1 is in the warm-up state or the torque deficiency is small; therefore, the startup state determining circuit 20 issues only the ON signal M2 in step S4 to actuate the motor generator 2 as a motor, then proceeds to step S8 which will be discussed later.

If Te<To, that is, if the determination result is YES, then it means that the engine 1 is in the low temperature state or the torque deficiency is large; therefore, the startup state determining circuit 20 issues the ON signals M1 and M2 in step S5 to actuate both the motor generator 2 and the starting motor 10.

At this time, the startup state determining circuit 20 first issues the ON signal M1 to close the ON/OFF switch 21 to actuate the starting motor 10, then issues the ON signal M2 after 0.01 second to 0.5 second has passed so as to actuate the motor generator 2 as a motor.

This is because large rush current flows into the starting motor 10 composed of a DC motor at the time of startup, causing the output voltage of the battery 4A to markedly drop momentarily; hence, if the motor generator 2 is actuated at the same time, the battery voltage would undesirably drop further.

As described above, the timing for activating the motor generator 2 is delayed over a period of 0.01 second to 0.5 second, during which the rush current flows, so as to prevent an abnormal drop in battery voltage, thus ensuring reliable operation of the entire device including the motor generator control circuit 5A.

Normally, the rush current of the DC motor at the time of startup sufficiently reduces in about 0.01 second to about 0.2 second. The delay time for activating the motor generator 2, however, is set to a range of 0.01 second to 0.5 second in order to securely prevent the abnormal drop in the battery voltage.

The engine 1 receives an adequate rotating torque for startup by activating the starting motor 10 and the motor generator 2 as described.

Subsequently, the startup state determining circuit 20 compares the revolution signal Re or the engine speed with a first predetermined number of revolutions R1 which corresponds to the number of cranking revolutions of the engine 1 to determine in step S6 whether the revolutions signal Re indicates the first predetermined number of revolutions R1 or more.

If Re≧R1, that is, if the determination result is YES, then it means that the engine speed has reached the cranking speed or the torque deficiency has reduced; hence, the startup state determining circuit 20 stops, in step S7, the output of the ON signal M1 to open the ON/OFF switch 21 to stop the starting motor 10 so as to continue the drive of the engine 1 only by the motor generator 2.

Next, in step S8, the startup state determining circuit 20 compares the revolution signal Re with a second predetermined number of revolutions R2 which corresponds to the idling speed to determine whether the revolution signal Re is the second predetermined number of revolutions R2 or more.

If Re≧R2, that is, if the determination result is YES, then it means that the engine speed has reached the idling speed and completed the startup; therefore, the startup state determining circuit 20 stops the output of the ON signal M2 to terminate the drive of the motor generator 2 in step S9.

After that, the motor generator 2 works as a motor to provide torque assist or as a generator at the time of power regeneration according to the operating condition of the engine 1.

Thus, the startup state determining circuit 20 issues only the ON signal M2 to actuate the motor generator 2 if the temperature signal Te or the engine temperature indicates the predetermined temperature To or higher (warm-up), that is, if the engine can be started up with a smaller assist torque; while it issues the ON signals M1 and M2 to actuate both the starting motor 10 and the motor generator 2 if the temperature signal Te indicates a temperature below the predetermined temperature To (low temperature startup).

Especially when the starting motor 10 is a DC motor, it poses a problem in that the brush thereof easily wears; however, the wear of the brush can be restrained according to the invention since it is determined whether only the motor generator 2 is to be actuated or both the starting motor 10 and the motor generator 2 are to be actuated according to the temperature signal Te thereby to minimize the need of actuating the starting motor 10.

Furthermore, since the starting motor 10 employs the DC motor featuring a high reduction ratio and good output torque characteristic for the startup of the engine 1 equipped with the motor generator 2, the assist load on the motor generator 2 for the engine 1 can be reduced even at the time of low-temperature startup.

Accordingly, the problem of the deficient torque at the time of actuating the motor generator 2 can be solved, and the sizes and capacities of the motor generator 2, the inverter 3A, and the battery 4A can be reduced, permitting lower cost to be achieved.

In addition, at the time of low-temperature startup of the engine 1, the motor generator 2 is actuated after the delay time of 0.01 second to 0.5 second has passed since only the starting motor 10 was actuated; therefore, an abnormal voltage drop resulting from the overlap of the rush current immediately after the starting motor 10 is actuated and the battery load at the time of actuating the motor generator 2 can be prevented, thus enabling the malfunction of electric circuitry to be prevented.

In addition, when the revolution signal Re or the engine speed reaches the first predetermined number of revolutions R1 or the cranking speed at the time of startup, the starting motor 10 is stopped and only the motor generator 2 is driven to furnish the engine 1 with a minimum of assist, so that unnecessary load on the battery 4A can be reduced.

When the revolution signal Re reaches the second predetermined number of revolutions R2 or the idling speed and the engine startup operation is completed, the operation of the motor generator 2 as a motor is stopped, making it possible to reduce the unnecessary load on the battery 4A.

Second Embodiment

In the first embodiment, the first and second predetermined numbers of revolutions R1 and R2 have been set individually as the reference values for determining the engine speed at the time of the low-temperature startup; however, they may alternatively be set to a single value.

For instance, only the predetermined number of revolutions R2 corresponding to the idling speed may be set, and when the revolution signal Re or the engine speed reaches the predetermined number of revolutions R2, the output of the ON signals M1 and M2 may be stopped.

What is claimed is:

1. A starter for an engine equipped with a motor generator, comprising:
   a motor generator directly connected to an engine;
   a battery connected to said motor generator via an inverter;
   a motor generator control circuit for controlling said motor generator via said inverter;

a starting motor composed of a DC motor connected to said engine at the time of startup;

an ON/OFF switch for selectively switching the feed of power from said battery to said starting motor;

various sensors for detecting the operating condition of said engine; and a startup state determining circuit which determines the startup state of said engine according to the operating condition of said engine and selectively issues ON signals to said ON/OFF switch and said motor generator control circuit;

wherein said various sensors include a key switch for generating a startup signal at the time of starting up said engine and a temperature sensor for generating a temperature signal corresponding to the temperature of said engine;

said startup state determining circuit issues the ON signal only to said motor generator control circuit to actuate said motor generator as a motor in a first startup state wherein said temperature signal indicates not less than a predetermined temperature which corresponds to the warm-up state of said engine, while it issues the ON signal to both said ON/OFF switch and said motor generator control circuit to actuate both said starting motor and said motor generator in a second startup state wherein said temperature signal indicates a temperature below said predetermined temperature; and said startup state determining circuit actuates said starting motor first, then actuates said motor generator after a delay time corresponding to a rush current period of said starting motor has elapsed in said second startup state.

2. A starter for an engine equipped with a motor generator according to claim 1, wherein:

said delay time is set within a range of 0.01 sec. to 0.5 sec.

3. A starter for an engine equipped with a motor generator, comprising:

a motor generator directly connected to an engine;

a battery connected to said motor generator via an inverter;

a motor generator control circuit for controlling said motor generator via said inverter;

a starting motor connected to said engine at the time of startup;

an ON/OFF switch for selectively switching the feed of power from said battery to said starting motor;

various sensors for detecting the operating condition of said engine which include a revolution sensor generating a revolution signal corresponding to the number of revolutions of said engine; and a startup state determining circuit which determines the startup state of said engine according to the operating condition of said engine and selectively issues ON signals to said ON/OFF switch and said motor generator control circuit;

wherein said various sensors include a key switch for generating a startup signal at the time of starting up said engine and a temperature sensor for generating a temperature signal corresponding to the temperature of said engine;

said startup state determining circuit issues the ON signal only to said motor generator control circuit to actuate said motor generator as a motor in a first startup state wherein said temperature signal indicates not less than a predetermined temperature which corresponds to the warm-up state of said engine, while it issues the ON signal to both said ON/OFF switch and said motor generator control circuit to actuate both said starting motor and said motor generator in a second startup state wherein said temperature signal indicates a temperature below said predetermined temperature; and the startup state determining circuit stops the ON signal to said ON/OFF switch if said revolution signal indicates not less than a first predetermined number of revolutions corresponding to the cranking speed of said engine after said starting motor and said motor generator are actuated in said second startup state.

4. A starter for an engine equipped with a motor generator according to claim 3, wherein:

said startup state determining circuit stops the ON signal to said motor generator control circuit if said revolution signal indicates not less than a second predetermined number of revolutions corresponding to the idling speed of said engine after the ON signal to said ON/OFF switch is stopped.

5. A starter for an engine equipped with a motor generator according to claim 3, wherein:

said various sensors include a revolution sensor generating a revolution signal corresponding to the number of revolutions of said engine; and said startup state determining circuit stops the ON signals to said ON/OFF switch and said motor generator control circuit if said revolution signal indicates not less than a predetermined number of revolutions corresponding to the idling speed of said engine after said starting motor and said motor generator are actuated in said second startup state.

* * * * *